US009198001B2

(12) United States Patent
Hatakeyama

(10) Patent No.: US 9,198,001 B2
(45) Date of Patent: Nov. 24, 2015

(54) WIRELESS COMMUNICATION TERMINAL USING TILT AND DIRECTION INFORMATION AND METHOD USING THE SAME

(71) Applicant: PANASONIC INTELLECTUAL PROPERTY MANAGEMENT CO., LTD., Osaka-Shi, Osaka (JP)

(72) Inventor: Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 14/203,443

(22) Filed: Mar. 10, 2014

(65) Prior Publication Data

US 2014/0274164 A1    Sep. 18, 2014

(30) Foreign Application Priority Data

Mar. 14, 2013 (JP) .................................. 2013-051993

(51) Int. Cl.
*H04W 24/00* (2009.01)
*H04W 4/02* (2009.01)
*H04W 4/04* (2009.01)

(52) U.S. Cl.
CPC .............. *H04W 4/026* (2013.01); *H04W 4/046* (2013.01)

(58) Field of Classification Search
CPC ... H04L 41/0853; H04L 43/045; H04W 4/02; H04W 4/028; H04W 64/006; H04W 4/023; H04W 4/026; H04W 4/04; H04W 4/043
USPC ...................................... 455/456.1–457, 522
See application file for complete search history.

(56) References Cited

U.S. PATENT DOCUMENTS

| 8,700,060 | B2* | 4/2014 | Huang ...................... 455/456.1 |
| 2004/0203918 | A1* | 10/2004 | Moriguchi et al. ........ 455/456.1 |
| 2006/0068699 | A1* | 3/2006 | Lee ......................... H04H 20/02 455/3.02 |
| 2007/0010259 | A1* | 1/2007 | Hoffmann .................. 455/456.1 |
| 2013/0099919 | A1* | 4/2013 | Cai ........................ G01S 5/0009 340/539.13 |
| 2013/0102332 | A1* | 4/2013 | Keerthi ................. H04W 4/026 455/456.6 |
| 2013/0279478 | A1* | 10/2013 | De Bruin et al. ............. 370/331 |
| 2014/0098682 | A1* | 4/2014 | Cao et al. ..................... 370/252 |

FOREIGN PATENT DOCUMENTS

JP    2005-223802 A    8/2005

* cited by examiner

*Primary Examiner* — Allahyar Kasraian
(74) *Attorney, Agent, or Firm* — Shinjyu Global IP

(57) ABSTRACT

The wireless access device is installed in a predetermined space so as to be connected to a wireless communication terminal. The wireless access device comprises a radio communication component, a controller and a memory. The radio communication component receives terminal location information, terminal position information, and communication situation information from the wireless communication terminal. The memory holds the terminal location information, the terminal position information, and the communication situation information such that they are associated with each other. The controller calculates a recommended tilt, and a recommended direction for the wireless communication terminal based on the terminal position information and the communication situation information. The radio communication component transmits the calculated information to the wireless communication terminal corresponding to the terminal location information.

13 Claims, 8 Drawing Sheets

FIG. 4A

| SEAT ID | ACQUIRED INFORMATION | | | |
|---|---|---|---|---|
| | TILT INFORMATION | DIRECTION INFORMATION | COMMUNICATION SITUATION INFORMATION | |
| ... | ... | ... | ... | |

FIG. 4B

| SEAT ID | RECOMMENDED INFORMATION | | |
|---|---|---|---|
| | RECOMMENDED TILT | RECOMMENDED DIRECTION | |
| ... | ... | ... | |

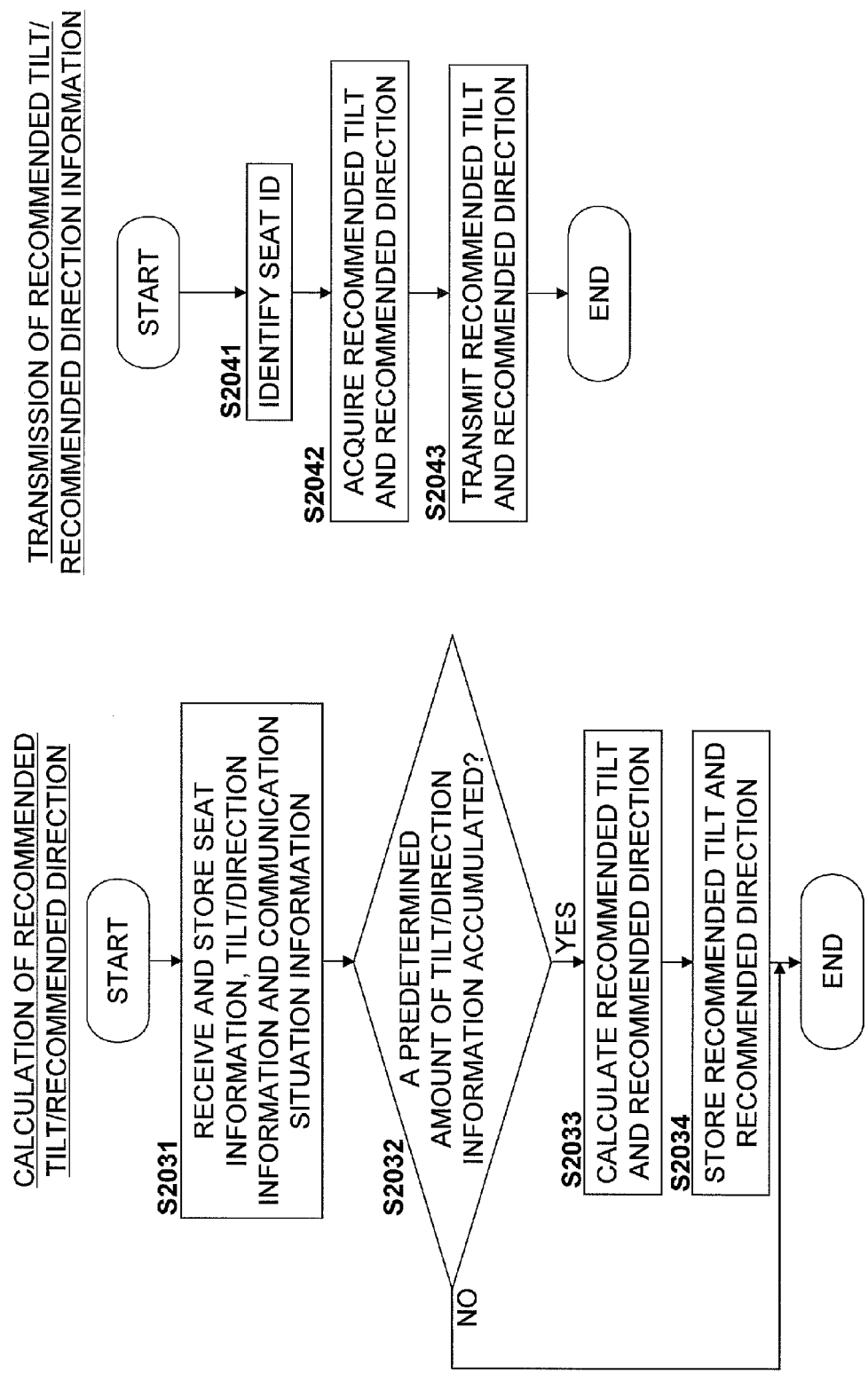

WIRELESS COMMUNICATION TERMINAL USING TILT AND DIRECTION INFORMATION AND METHOD USING THE SAME

PRIORITY

This claims priority under 35 U.S.C. §119 to Japanese Patent Application No. 2013-051993 filed on Mar. 14, 2013. The entire disclosure of Japanese Patent Application No. 2013-051993 is hereby incorporated herein by reference.

BACKGROUND

1. Technical Field

The disclosure relates to a wireless communication terminal, a wireless access device, a wireless communication system, and a wireless communication method for performing wireless communication within a specific space.

2. Background Art

A mobile communication device having plural antennas is known by, for example, Japanese Patent Laid-open Publication No. 2005-223802. The mobile communication device described in Japanese Patent Laid-open Publication No. 2005-223802 selects and uses one antenna that has better reception than the others, according to a tilt of the mobile communication device, in order to ensure communication quality.

SUMMARY

The reception of a wireless communication terminal is greatly affected by the position of the wireless communication terminal relative to a base station.

This disclosure provides a wireless communication terminal, a wireless access device, a wireless communication system, and a wireless communication method that are effective in ensuring a good wireless connection within a specific space.

The wireless communication terminal according to this disclosure is a wireless communication terminal configured to be connected to a wireless access device installed in a predetermined space. The wireless communication terminal comprises a controller and a radio communication component. The controller is configured to acquire terminal location information and terminal position information. The terminal location information indicates information corresponding to a location where the wireless communication terminal is used. The terminal position information indicates at least one of a tilt and a direction of the wireless communication terminal. The radio communication component is configured to transmit the terminal location information, and the terminal position information, to the wireless access device.

The wireless access device according to this disclosure is installed in a predetermined space, and is configured to be connected to a wireless communication terminal. The wireless access device comprises a radio communication component, a controller, and a memory. The radio communication component is configured to receive terminal location information, terminal position information, and communication situation information from the wireless communication terminal. The terminal location information indicates information corresponding to a location where the wireless communication terminal is used. The terminal position information indicates at least one of a tilt and a direction of the wireless communication terminal. The communication situation information indicates a communication situation between the wireless access device and the wireless communication terminal at a time of acquisition of the terminal position information. The controller is configured to acquire the terminal location information, the terminal position information, and the communication situation information received by the radio communication component. The memory is configured to hold the terminal location information, the terminal position information, and the communication situation information so as to be associated with each other. The controller is further configured to calculate recommended position information based on the terminal position information and the communication situation information. The recommended position information indicates at least one of a recommended tilt and a recommended direction for the wireless communication terminal. The radio communication component is also configured to transmit the recommended position information to the wireless communication terminal corresponding to the terminal location information.

The wireless communication terminal, the wireless access device, the wireless communication system, and the wireless communication method according to this disclosure are effective in ensuring a good wireless connection within a specific space.

BRIEF DESCRIPTION OF DRAWINGS

FIG. 4A and FIG. 4B are diagrams each illustrating the content of information in a database.

FIG. 8A and FIG. 8B are flow charts illustrating processes performed by the access point.

DETAILED DESCRIPTION

Embodiments will now be described with reference to the drawings. Excessive details may be omitted. To avoid redundancy and help easy understanding for those skilled in the art, features known in the art may not be described in detail and substantially the same components may not be described in duplicate.

The attached drawings and description provided by the inventors are intended for those skilled in the art to fully understand the disclosure, and shall not limit the subject matter claimed.

The same letters, symbols, and numerals refer to the same elements unless otherwise specified. Elements that are not essential to the invention are not shown unless otherwise specified.

Embodiment 1-1 Configuration of Wireless Communication System 1

One embodiment of the invention will now be described. The embodiment is applied to a cabin (an example of a predetermined space) of an airplane as one of transportation means. The cabin blocks out electromagnetic waves from outside.

Figure 1:
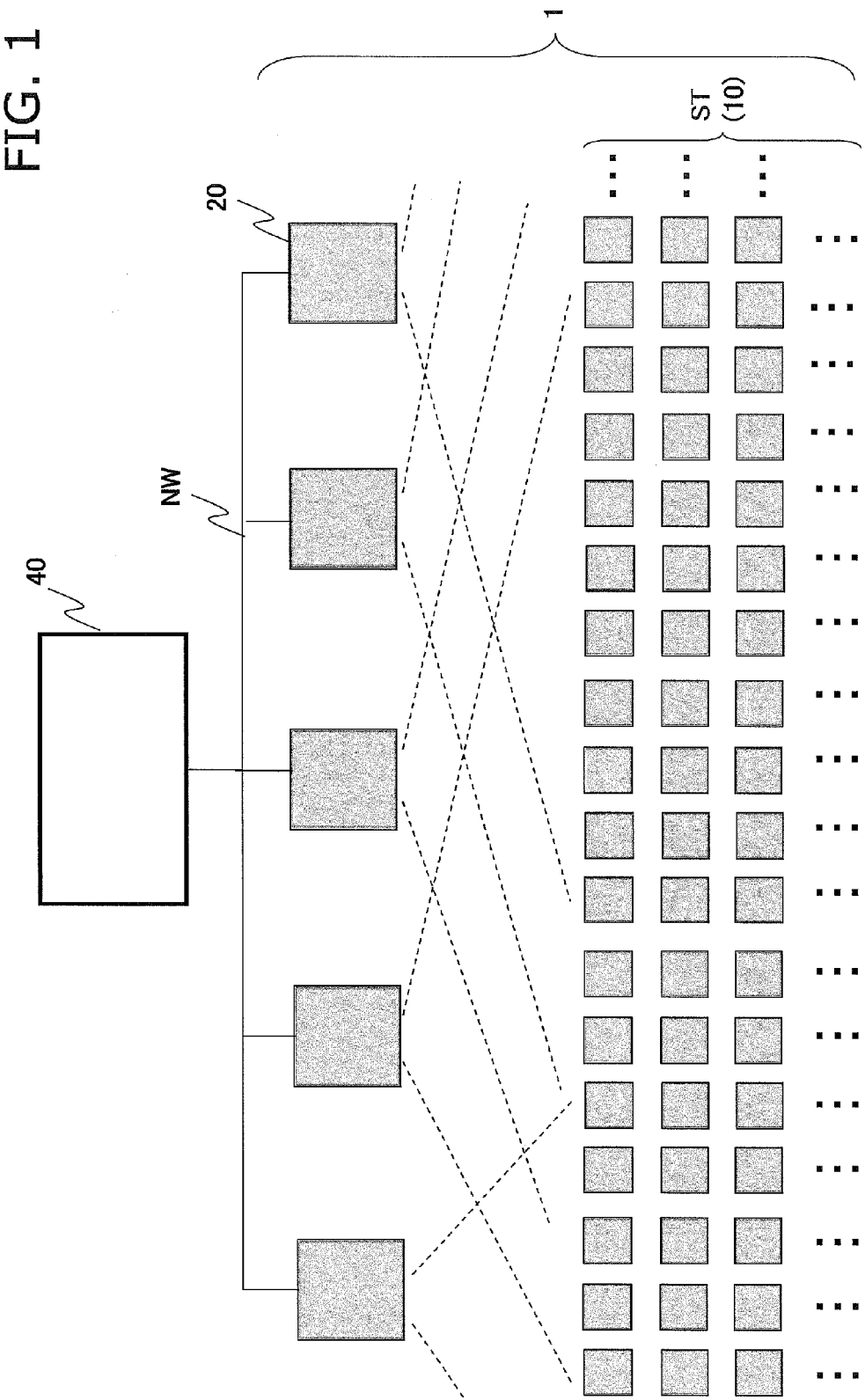
FIG. 1 is a diagram illustrating the schematic configuration of a wireless communication system according to one embodiment.

FIG. 1 schematically shows an overall configuration of the wireless communication system 1 (an example of a wireless communication system). The wireless communication system 1 comprises an access point 20 (an example of a wireless access device) and a wireless communication terminal 10 (an example of a wireless communication terminal) used by a passenger (user). One or more access points 20 are installed in the airplane. The access point 20 is connected to a server 40 via a cable NW. The server 40 is connected to an airplane system and installed in the airplane. The wireless communication terminal 10 and the access point 20 are wirelessly connected to each other, and form a wireless LAN. The server 40 is also connected to display devices (not shown), provided to seats ST, via a cable.

The number of access points 20 is not limited to what is shown in the drawings. There may be more or less access points 20 according to a size or type of the airplane. The dotted lines, extended from each access point 20 in FIG. 1, illustrate a range of access (hereafter referred to as a communication area) of the radio wave of each access point 20.

The communication area of the wireless communication system 1 installed in the cabin of the airplane, as shown in FIG. 1, covers the cabin area of the airplane.

In the airplane, a predetermined number of seats ST are arranged in two or more rows. The access points 20, each serving as a radio base station, are arranged so that each access point 20 covers a part of the communication area that corresponds to some of the seats ST. The entire communication area, corresponding to all the seats ST, is covered by the plural access points 20.

1-1-1 Configuration of Wireless Communication Terminal 10

Figure 2:
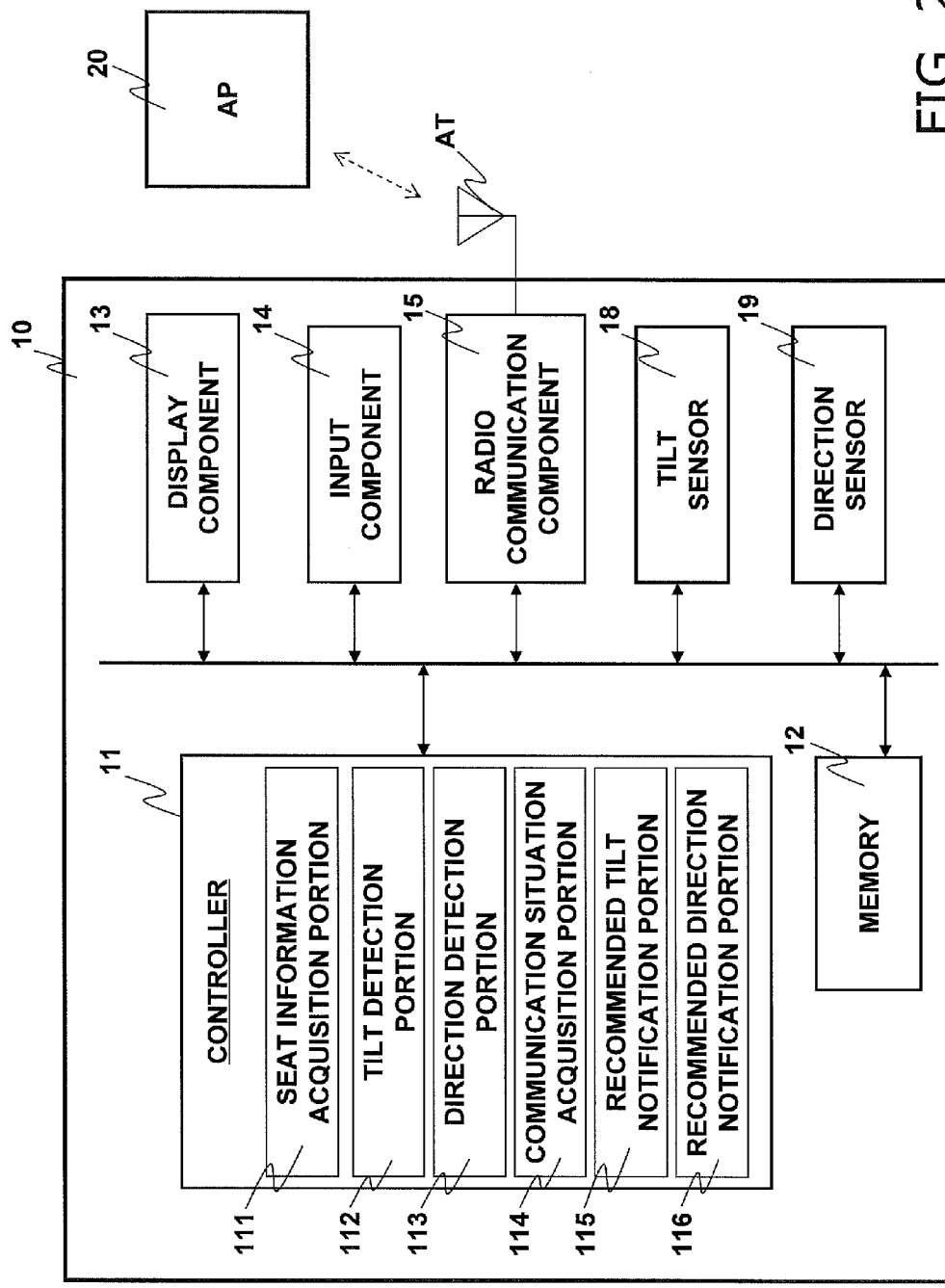
FIG. 2 is a diagram illustrating the schematic configuration of a wireless communication terminal according to the embodiment.

FIG. 2 schematically shows an example of configuration of the wireless communication terminal 10. The wireless communication terminal 10 is a personal digital assistant, such as a smartphone or a tablet computer, which is carried by a passenger on the airplane. The wireless communication terminal 10 comprises a controller 11 (an example of a controller), a memory 12, a display component 13 (an example of a display component), an input component 14, a radio communication component 15 (an example of a radio communication component), a tilt sensor 18, and a direction sensor 19. The controller 11 is connected to the other components via buses.

The controller 11 includes a CPU, etc. and performs various functions of the wireless communication terminal 10 by executing a predetermined program.

The memory 12 holds various data that the controller 11 processes. The display component 13 has a display screen, such as LCD or an organic electroluminescence display, which displays information acquired from the access point 20 according to an instruction of the controller 11. The information includes a recommended tilt and a recommended direction that will be described later. The information may also include any other information that has been requested by the controller 11. The input component 14 is an input means such as a touch panel displayed on the display component 13, a manual operation button, a keyboard, or a mouse. The input component 14 transmits the information inputted by a user's operation to the controller 11. The radio communication component 15 is a radio interface that wirelessly sends out information generated by the controller 11 and receives information from the access point 20, through the antenna AT.

The tilt sensor 18 is an accelerometer, for example. The tilt sensor 18 is a sensor that is capable of detecting a tilt of a body of the wireless communication terminal 10.

The direction sensor 19 is a gyroscope sensor, for example. The direction sensor 19 is a sensor that is capable of detecting a direction of the wireless communication terminal 10. The direction is determined on the basis of north, south, east and west (hereinafter, the direction is referred to as an absolute direction). Although the tilt sensor 18 and the direction sensor 19 are separately shown in the drawing, an integrated sensor such as a 6-axis sensor may be used.

The controller 11 performs the functions of a seat information acquisition portion 111, a tilt detection portion 112, a direction detection portion 113, a communication situation acquisition portion 114, a recommended tilt notification portion 115, and a recommended direction notification portion 116.

The seat information acquisition portion 111 acquires seat information (an example of terminal location information) including a seat number, etc. which has been inputted by the user.

The tilt detection portion 112 converts a signal detected by the tilt sensor 18 into data and figures out a tilt of the wireless communication terminal 10. The direction detection portion 113 converts a signal detected by the direction sensor 19 into data and figures out a direction of the wireless communication terminal 10 that is an absolute direction on the basis of north, south, east and west.

The communication situation acquisition portion 114 acquires a communication situation after the connection to the access point 20 is established. The communication situation may be electric wave intensity information, error information (BER etc.), or other such information. In a case where MIMO (multiple-input and multiple-output) is used for communication between the wireless communication terminal 10 and the access point 20, the communication situation acquisition portion 114 acquires the matrix information of a MIMO antenna.

The recommended tilt notification portion 115 generates recommended tilt information to be shown to a user, based on the data transmitted from the access point 20 indicating a recommended tilt. The recommended tilt information is displayed on the display component 13. The recommended direction notification portion 116 generates recommended direction information to be shown to a user, based on the data transmitted from the access point 20 indicating a recommended direction. The recommended direction information is displayed on the display component 13.

1-1-2 Configuration of Access Point 20

Figure 3:
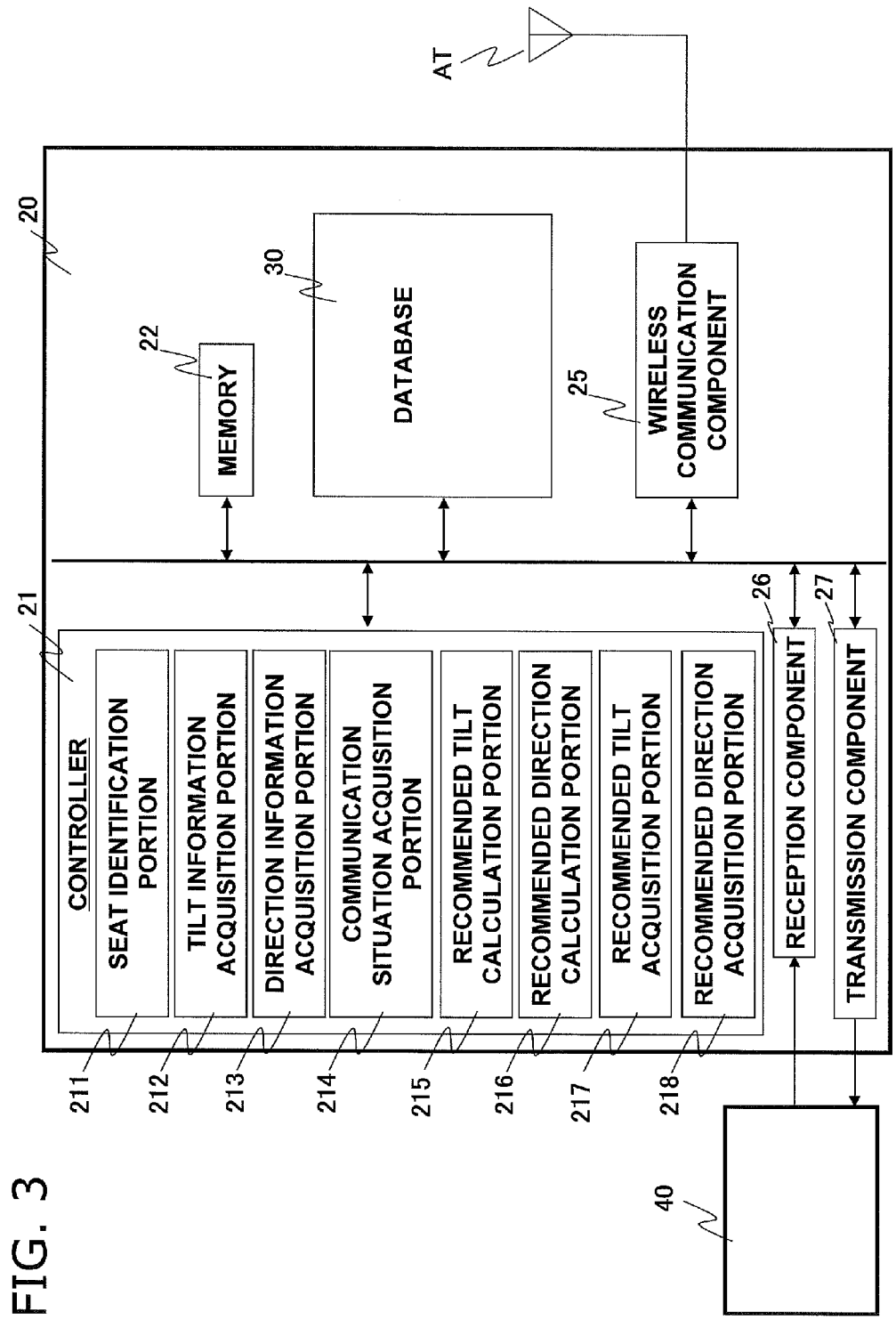
FIG. 3 is a diagram illustrating the schematic configuration of an access point according to the embodiment.

FIG. 3 schematically shows an example of configuration of the access point 20. The access point 20 is a wireless LAN access point, for example, that forms a wireless LAN together with the wireless communication terminal 10 which is a radio communication device based on the IEEE802.11 standards. The access point 20 is connected to the server 40 included in an airplane system via a cable, acquires from the server 40 information that the airplane system holds, and transmits the acquired information to the wireless communication terminal 10. The information that the airplane system holds includes content information, flight information, environmental information, and other such information.

The access point 20 includes, for example, a controller 21 (an example of a controller), a memory 22, a radio communication component (an example of a radio communication component), a reception component 26, a transmission component 27, and a database 30 (an example of a memory).

The controller 21 includes a CPU, etc. and controls the memory 22, the radio communication component 25, the reception component 26, and the transmission component 27. The memory 22 holds various data that the controller 21 processes. The radio communication component 25 transmits information to the wireless communication terminal 10 and receives a signal from the wireless communication terminal 10, through the antenna AT. The reception component 26 receives information from the server 40. The transmission component 27 transmits the information from the wireless communication terminal 10 to the server 40.

The controller 21 executes the functions of a seat identification portion 211, a tilt information acquisition portion 212, a direction information acquisition portion 213, a communication situation acquisition portion 214, a recommended tilt calculation portion 215, a recommended direction calculation portion 216, a recommended tilt acquisition portion 217, and a recommended direction acquisition portion 218.

The seat identification portion 211 acquires seat information transmitted from the wireless communication terminal 10 and identifies a seat.

The tilt information acquisition portion 212 acquires tilt information transmitted from the wireless communication terminal 10 and stores the tilt information in the database, 30 so as to be associated with the seat information, as shown in FIG. 4A.

The direction information acquisition portion 213 acquires direction information transmitted from the wireless communication terminal 10. The direction information acquired from the wireless communication terminal 10 is an absolute direction. Therefore, the direction information acquisition portion 213 acquires information indicating a traveling direction of the boarding airplane from the server 40 of the airplane system and calculates a relative direction on the basis of the travelling direction. The direction information acquisition portion 213 then stores the calculated relative direction as direction information, so as to be associated with the seat information in the database 30, as shown in FIG. 4A.

The communication situation acquisition portion 214 acquires communication situation information at the time of acquisition of tilt information and direction information (hereinafter referred to as communication situation information corresponding to tilt information and direction information). The communication situation acquisition portion 214 stores the communication situation information in the database 30, so as to be associated with seat information, tilt information, and direction information, as shown in FIG. 4A.

The recommended tilt calculation portion 215 calculates a recommended tilt with respect to the corresponding seat information, based on the seat information, the tilt information, and the communication situation information stored in the database 30. The recommended tilt calculation portion 215 then stores the calculated recommended tilt in the database 30, so as to be associated with seat information, as shown in FIG. 4B. The recommended tilt may be calculated by, for example, selecting a tilt that corresponds to a best communication situation from among the accumulated pieces of communication situation information, or selecting a tilt that makes a good communication situation on average. Alternatively, the recommended tilt may be calculated by selecting a tilt that best mitigates bad communication situations.

The recommended direction calculation portion 216 calculates a recommended direction with respect to the corresponding seat information, based on the seat information, the direction information, and the communication situation information stored in the database 30. The recommended direction calculation portion 216 then stores the calculated recommended direction in the database 30, so as to be associated with seat information, as shown in FIG. 4B. The recommended direction may be calculated by, for example, selecting a direction that corresponds to a best communication situation from among the accumulated pieces of communication situation information or selecting a direction that makes a good communication situation on average. Alternatively, the recommended direction may be calculated by selecting a direction that makes the least bad communication situations.

The recommended tilt acquisition portion 217 acquires recommended tilt information from the database 30, and transmits the acquired recommended tilt information to the wireless communication terminal 10 through the radio communication component 25. The recommended direction acquisition portion 218 acquires recommended direction information from the database 30, and transmits the acquired recommended direction information to the wireless communication terminal 10 through the radio communication component 25.

1-2 Operation of Wireless Communication System 1

The operation of the wireless communication terminal 10 and the access point 20 in the wireless communication system 1 will be explained with references to FIG. 5 to FIG. 8.

1-2-1 Operation of Wireless Communication Terminal 10

Figure 5:
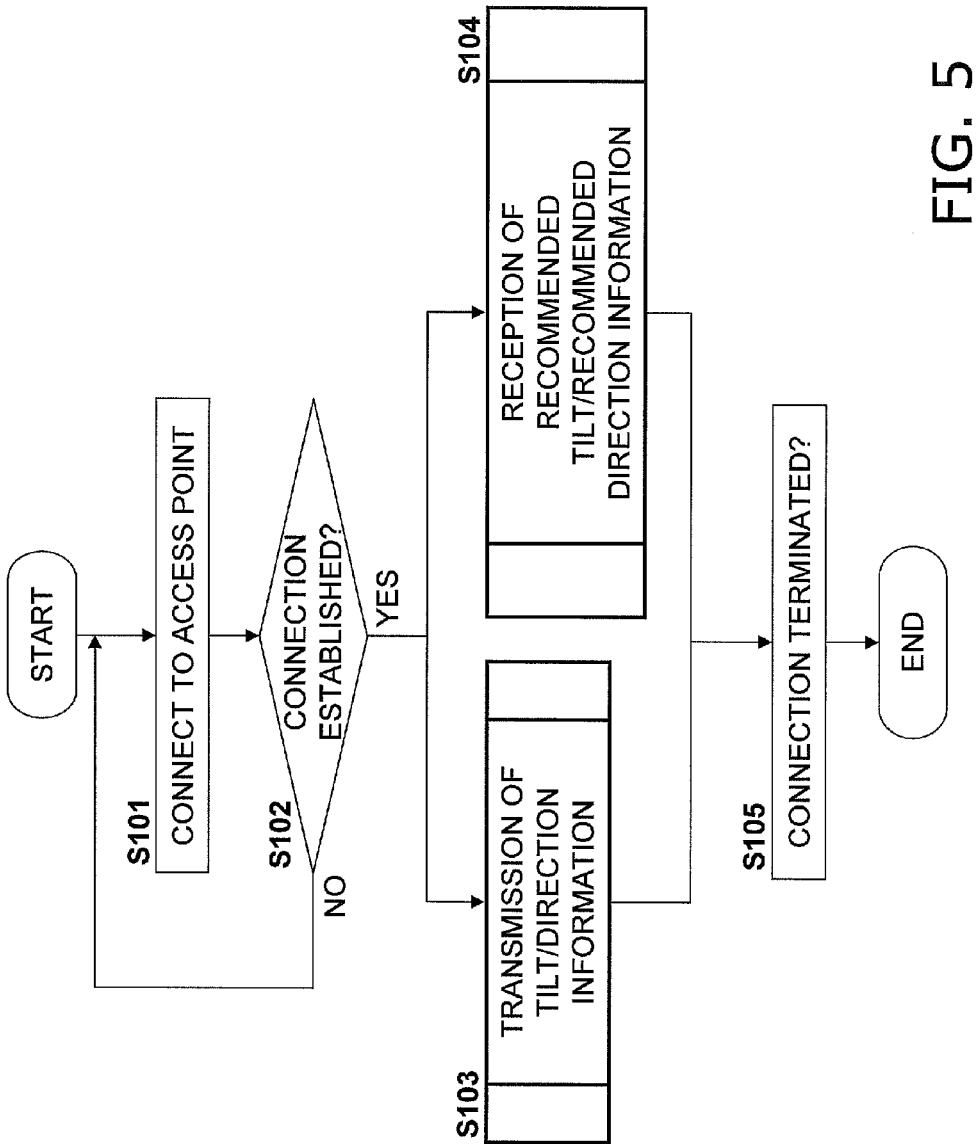
FIG. 5 is a flow chart illustrating an overall operation performed by the wireless communication terminal.

FIG. 5 shows the flow of the entire operation performed by the wireless communication terminal 10 according to this Embodiment.

Step S101: The wireless communication terminal 10 makes connection to a predetermined access point 20.

This connection is made according to a method implemented by a well-known wireless LAN (for example, WiFi) or other such method. For example, when the server 40 starts its service in the airplane in a state that permits wireless communication, each access point 20 starts to transmit beacon signals. The wireless communication terminal 10 receives beacon signals, and then connection processing is performed between the predetermined access point 20 (hereafter, referred to as connected access point 20) and the wireless communication terminal 10, using a shared predetermined ID (for example, SSID).

During this process, the user of the wireless communication terminal 10 downloads a predetermined program, if needed. This predetermined program is a program for transmitting tilt information and direction information of the wireless communication terminal 10 to the connected access point 20. The program is also for receiving, from the connected access point 20, information that indicates a recommended tilt and a recommended direction; and displaying such received information on a screen.

The predetermined program is not necessarily downloaded in this process. Instead, the program may be installed beforehand in the wireless communication terminal 10 as a dedicated connection tool.

The program may be downloaded to the wireless communication terminal 10 from another communication terminal (for example, a display device provided to a seat) connected to the wireless communication terminal 10, and to the server 40 via a cable.

Step S102: When the connection to the connected access point 20 is established, the process goes to Step S103 and Step S104, respectively.

Step S103: The wireless communication terminal 10 performs processes for transmitting tilt information and direction information, which will be described later.

Step S104: The wireless communication terminal 10 performs processes for receiving recommended tilt information and recommended direction information, which will be described later.

Step S105: The wireless communication terminal 10 terminates the connection to the connected access point 20, according to a predetermined operation.

1-2-1-1 Transmission of Tilt Information and Direction Information

Figures 6A, 6B:
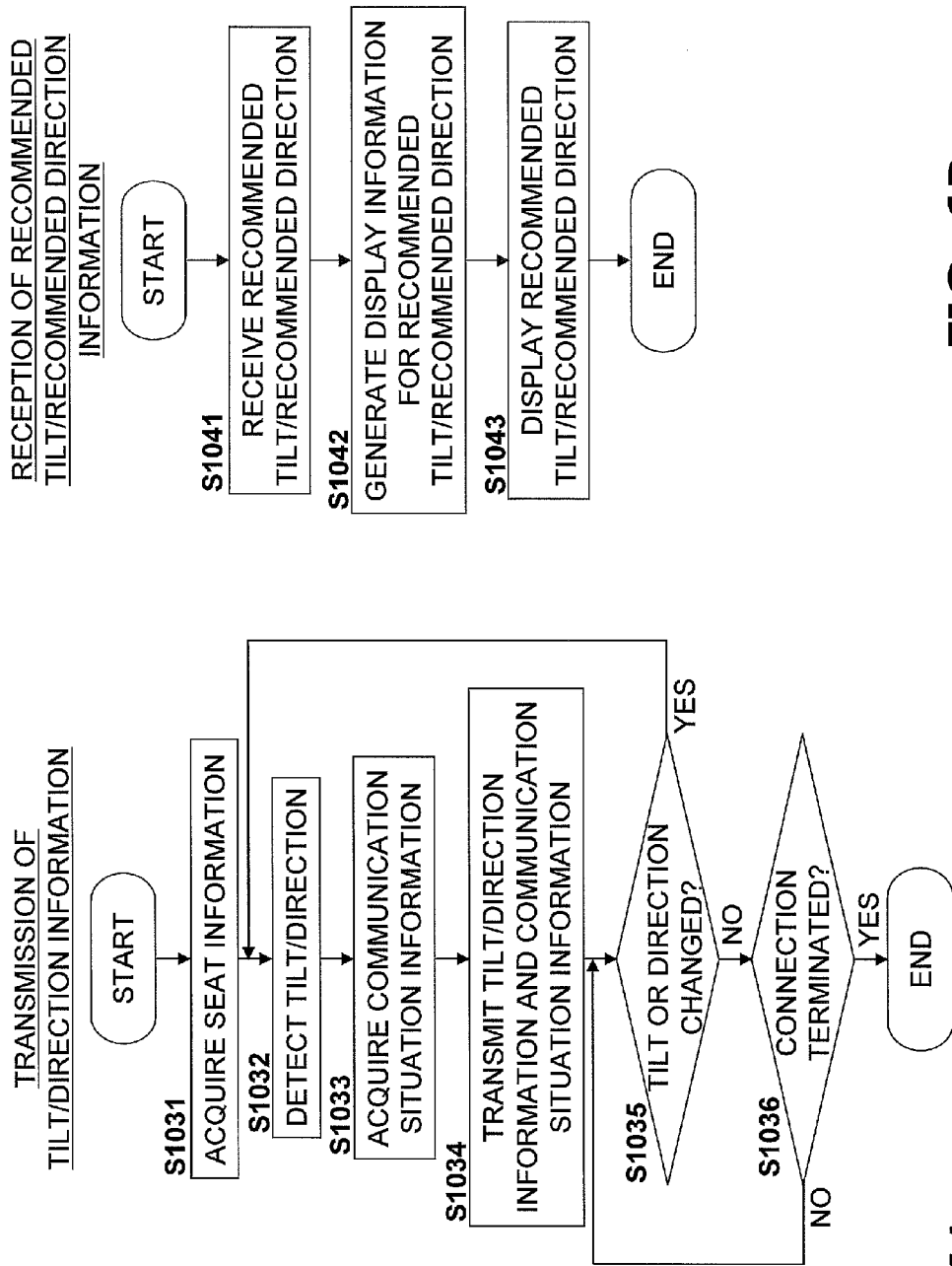
FIG. 6A and FIG. 6B are flow charts illustrating processes performed by the wireless communication terminal.

FIG. 6A shows the processes for transmission of tilt information and direction information by the wireless communication terminal 10 (corresponding to Step S103 of FIG. 5).

Step S1031: The seat information acquisition portion 111 of the wireless communication terminal 10 acquires user's seat information. The user may input the seat information through the input component 14, or may input the seat information using another communication terminal that is, for example, a display device provided to a seat. Alternatively, the user may input the seat information using a radio tag attached to a seat, or through infrared communication function.

Step S1032: The tilt detection portion 112 converts a signal detected by the tilt sensor 18 into data, and figures out the tilt of the wireless communication terminal 10.

Furthermore, the direction detection portion 113 converts a signal detected by the direction sensor 19 into data, and figures out the direction of the wireless communication terminal 10. The direction detection portion 113 acquires an absolute direction (based on north, south, east and west) according to the signal detected by the direction sensor 19.

Step S1033: The communication situation acquisition portion 114 acquires a communication situation in the connection to the connected access point 20 at the time of acquisition of the tilt information and the direction information in Step S1032. The communication situation includes radio wave intensity information, error information (BER etc.), matrix information of a MIMO antenna, etc.

Step S1034: The controller 11 transmits the acquired tilt information, direction information and communication situation information, together with the acquired seat information, to the connected access point 20 through the radio communication component 15.

Step S1035: If at least one of the tilt and the direction of the wireless communication terminal 10 is changed to a greater degree than a given value, the process goes back to step S1032, in which the tilt detection portion 112 or the direction detection portion 113 detects the changed tilt or direction.

Step S1036: The controller 11 ends the processing when the connection to the connected access point 20 is terminated.

1-2-1-2 Reception of Recommended Tilt Information and Recommended Direction Information FIG. 6B shows the processes for reception of recommended tilt information and recommended direction information by the wireless communication terminal 10 (corresponding to Step S104 of FIG. 5).

Step S1041: The wireless communication terminal 10 receives information that indicates a recommended tilt and a recommended direction from the connected access point 20 through the radio communication component 15. The received recommended direction is a relative direction that is a direction with respect to the travelling direction of movement of the airplane and calculated by the access point 20.

Step S1042: The recommended tilt notification portion 115 generates recommended tilt information based on the received information indicating a recommended tilt and displays the recommended tilt information on the display component 13. The recommended direction notification 116 generates recommended direction information based on the received information indicating a recommended direction and displays the recommended direction information on the display component 13.

Step S1043: The display component 13 displays the recommended tilt information and the recommended direction information on a screen. This information may be displayed using text or graphics.

1-2-2 Operation of Access Point 20

Figure 7:
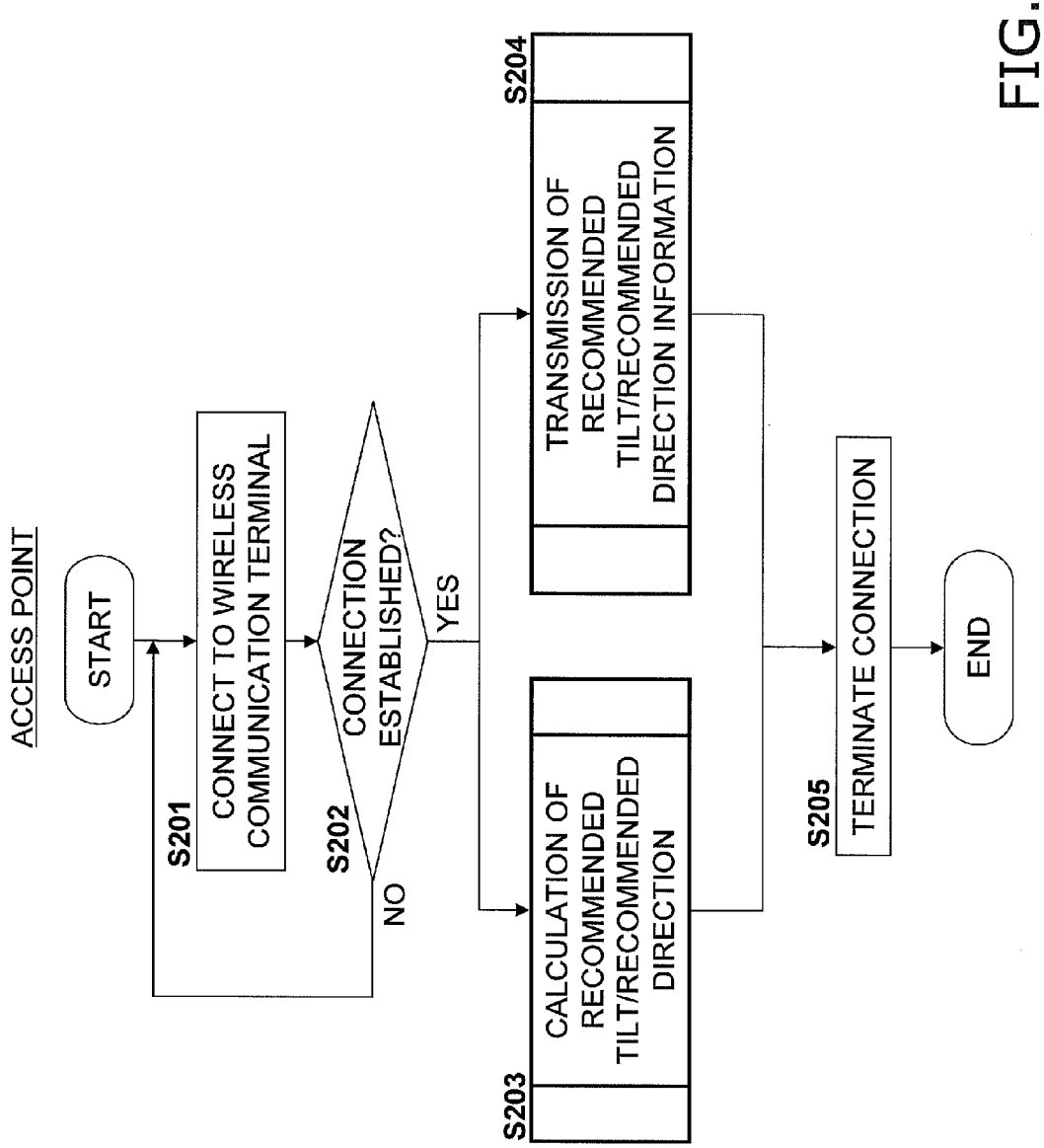
FIG. 7 is a flow chart illustrating an overall operation performed by the access point.

FIG. 7 shows the flow of operation of the access point 20 according to this Embodiment.

Step S201: The access point 20 makes a connection to the wireless communication terminal 10 according to a request for connection from the wireless communication terminal 10. This process corresponds to Step S101 described above.

Step S202: When the connection to the wireless communication terminal 10 is established, the process goes to Step S203 and Step S204, respectively.

Step S203: The access point 20 performs processes for calculating a recommended tilt and a recommended direction, which will be described later.

Step S204: The access point 20 performs processes for transmitting a recommended tilt and a recommended direction, which will be described later.

Step S205: The access point 20 terminates the connection according to a request for termination of connection from the wireless communication terminal 10.

1-2-2-1 Calculation of Recommended Tilt and Recommended Direction

FIG. 8A shows the processes for calculation of a recommended tilt and a recommended direction by the access point 20 (corresponding to Step S203 of FIG. 7).

Step S2031: The seat identification portion 211, the tilt information acquisition portion 212, the direction information acquisition portion 213, and the communication situation acquisition portion 214 receive seat information, tilt information, direction information, and a communication situation from the wireless communication terminal 10, respectively, through the radio communication component 25, and store these received pieces of information in the database 30.

Step S2032: The controller 21 refers to the database 30 and determines whether more than a predetermined amount of data relating to the tilt information, the direction information, and the communication situation that are associated with the received seat information have been accumulated. If there is more than the predetermined amount of accumulated data that enable calculation of recommended information, the process goes to step S2032 for calculating a recommended tilt and a recommended direction. If not, the calculation will not be executed.

Step S2033: The recommended tilt calculation portion 215 calculates a recommended tilt for the associated seat information, when more than the predetermined amount of seat information, tilt information, and communication situation have been accumulated in the database 30. The recommended tilt may be calculated by, for example, selecting a tilt that corresponds to a best communication situation from among the accumulated pieces of communication situation information or selecting a tilt that makes a good communication situation on average. Alternatively, the recommended tilt may be calculated by selecting a tilt that best mitigates bad communication situations. The recommended direction calculation portion 216 calculates a recommended direction that corresponds to the seat information based on the seat information, direction information, and communication situation that have been accumulated in the database 30. The recommended direction may be calculated by, for example, selecting a direction that corresponds to a best communication situation from among the accumulated pieces of communication situation information, or selecting a direction that makes a good communication situation on average. Alternatively, the recommended direction may be calculated by selecting a direction that makes the least bad communication situations.

Step S2034: The recommended tilt calculation portion 215 and the recommended direction calculation portion 216 store the calculated recommended tilt and the recommended direction in the database 30.

The wireless communication terminal 10 may not be connected when the recommended tilt and the recommended direction are calculated. Instead, the recommended tilt and the recommended direction may be calculated while the wireless communication terminal 10 is being disconnected.

1-2-2-2 Transmission of Recommended Tilt and Recommended Direction

FIG. 8B shows the processes for transmitting recommended tilt information and recommended direction information by the access point 20 (corresponding to Step S204 of FIG. 7).

Step S2041: The seat identification portion 211 of the access point 20 identifies seat information received from the wireless communication terminal 10.

Step S2042: The recommended tilt acquisition portion 217 acquires, from the database 30, the recommended tilt information associated with the identified seat information. The recommended direction acquisition portion 218 acquires, from the database 30, the recommended direction information associated with the identified seat information.

Step S2043: The recommended tilt acquisition portion 217 and the recommended direction acquisition portion 218 transmit the acquired recommended tilt information and recommended direction information to the connected wireless communication terminal 10 through the radio communication component 25.

1-3 Effects, Etc.

According to the above Embodiment, the wireless communication terminal 10 transmits tilt information and direction information to the access point 20. Furthermore, the access point 20 retains the tilt information and direction information received from the wireless communication terminal 10 so as to be associated with a communication situation. From the retained information, the access point 20 calculates a recommended tilt and a recommended direction associated with a seat where the wireless communication terminal 10 is used. The access point 20 then transmits the recommended tilt and direction to the wireless communication terminal 10. The information indicating the recommended tilt and direction is displayed on the wireless communication terminal 10. Therefore, the user using the wireless communication terminal 10 at the seat can change a tilt or a direction of the wireless communication terminal 10 according to the displayed recommended tilt or direction, which would keep a best communication situation between the wireless communication terminal 10 and the access point 20.

Furthermore, as a direction of the wireless communication terminal 10, the relative direction with respect to the travelling direction of the airplane is calculated by the access point 20 and acquired as a recommended direction. Therefore, the user can be aware of a most suitable direction for the wireless communication terminal 10, regardless of a travelling direction of the airplane.

Other Embodiments

Although the embodiment of the present invention has been described based on the drawings, the specific structures of the invention should not be limited to those described in the above embodiment. The present invention may be changed and modified variously without departing from the spirit or scope of the invention. For example, the present invention may be modified in the following forms.

(1)

The wireless communication terminal 10 may transmit either one of tilt information and direction information to the access point 20. The access point 20 may calculate either one of recommended tilt information and recommended direction information and transmit the recommended tilt information or the recommended direction information to the wireless communication terminal 10.

(2)

In the above embodiment, the wireless communication terminal 10 transmits communication situation information associated with the tilt information and the direction information that the wireless communication terminal 10 acquired to the access point 20, but this is not the only option. The access point 20 may measure a communication situation (radio wave intensity or BER, etc.) while being connected to the wireless communication terminal 10, and may acquire it as communication situation information.

(3)

In the above embodiment, the wireless communication terminal 10 transmits an absolute direction to the connected access point 20, and then the connected access point 20 calculates a relative direction with respect to the travelling direction of the airplane. However, this is not the only option. The wireless communication terminal 10 may acquire information on the travelling direction of the airplane from the connected access point 20, then calculate a relative direction based on the acquired information and the absolute direction that the wireless communication terminal 10 acquires, and then transmit the calculated relative direction information to the access point as direction information.

(4)

The access point 20 may acquire seat information by way of the following processes other than receiving it from the wireless communication terminal 10. For example, ID information or passenger information (an example of terminal location information) of the wireless communication terminal 10 may be transmitted to the access point 20. The access point 20 may then match the received terminal ID information or passenger information to the terminal ID information or passenger information that can be acquired from reservation information, boarding information, etc. received from the airplane system, by which seat information can be identified and acquired.

(5)

In the above embodiment, a single access point 20 is connected for each seat, but this is not the only option. In a case where two or more access points 20 are installed in the airplane and the wireless communication terminal 10 needs to make a connection to an access point 20 other than the connected one due to its operation situation (breakdown, etc.) or its bad communication situation, the wireless communication terminal 10 can execute the same processes as in the above embodiment with respect to the other access point 20.

(6)

In the above embodiment, the wireless communication terminal 10 connected to the access point 20 transmits updated tilt information and direction information when more than a predetermined amount of change occurs in the tilt or the direction (Step S1035 of FIG. 6A). This process may be omitted. Alternatively, the wireless communication terminal 10 may transmit tilt information and direction information each time the wireless communication terminal 10 is connected to the access point 20.

(7)

The recommended tilt information or the recommended direction information may be notified using a sound function of the wireless communication terminal 10.

(8)

The database 30 may be provided to a device (for example, server) that is separate from the access point 20 and may be connected to the access point 20.

(9)

Although the above embodiment is applied to the system used for an airplane, the embodiment is applicable to any space where the access point and the wireless communication terminal can be fixedly installed. For example, the above embodiment is applicable to a train such as a bullet train, a conference room, or a hall.

The above disclosure is therefore applicable as a wireless communication terminal, a wireless access device, a wireless communication system used in a specific space, and a wireless communication method.

What is claimed:

1. A wireless communication terminal configured to be connected to a wireless access device installed in a predetermined space, the wireless communication terminal comprising:
    a memory for holding information processed by a controller,
    the controller configured to acquire terminal location information and terminal position information, the terminal location information indicating information corresponding to a location where the wireless communication terminal is used, and the terminal position information indicating at least one of a tilt and a direction of the wireless communication terminal;
    a radio communication component configured to transmit the terminal location information and the terminal position information to the wireless access device,
        wherein the radio communication component is configured to receive recommended position information indicating at least one of a recommended tilt and a recommended direction for the wireless communication terminal corresponding to the terminal location information; and
    a display component configured to display the recommended position information.

2. The wireless communication terminal according to claim 1,
    wherein the controller is configured to acquire communication situation information indicating a communication situation between the wireless access device and the wireless communication terminal at a time of acquisition of the terminal position information, and
    the radio communication component is configured to transmit the communication situation information to the wireless access device.

3. The wireless communication terminal according to claim 1,
    wherein the controller is configured to calculate a direction and a tilt that correspond to a better communication situation from among accumulated pieces of communication information when calculating recommended direction and tilt.

4. The wireless communication terminal according to claim 1, wherein the controller is configured to calculate a relative direction of the wireless communication terminal with respect to a moving direction of the predetermined space and acquire information indicating the direction of the wireless communication terminal based on the relative direction.

5. A wireless access device installed in a predetermined space and configured to be connected to a wireless communication terminal, the wireless access device comprising:
    a radio communication component configured to receive terminal location information, terminal position information and communication situation information from the wireless communication terminal, the terminal location information indicating information corresponding to a location where the wireless communication terminal is used, the terminal position information indicating at least one of a tilt and a direction of the wireless communication terminal, and the communication situation information indicating a communication situation between the wireless access device and the wireless communication terminal at a time of acquisition of the terminal position information;
    a controller configured to acquire the terminal location information, the terminal position information, and the communication situation information received by the radio communication component; and
    a memory configured to hold the terminal location information, the terminal position information and the communication situation information so as to be associated with each other, wherein
        the controller is configured to calculate recommended position information based on the terminal position information and the communication situation information, the recommended position information indicating at least one of a recommended tilt and a recommended direction for the wireless communication terminal, and
        the radio communication component is configured to transmit the recommended position information to the wireless communication terminal corresponding to the terminal location information.

6. The wireless access device according to claim 5, wherein the controller is configured to calculate a relative direction of the wireless communication terminal with respect to a moving direction of the predetermined space and configured to acquire information indicating the direction of the wireless communication terminal based on the relative direction.

7. The wireless access device according to claim 5, wherein the controller is configured to calculate a direction and a tilt that correspond to a better communication situation from among accumulated pieces of communication information when calculating recommended direction and tilt.

8. A wireless access device installed in a predetermined space and configured to be connected to a wireless communication terminal, the wireless access device comprising:
    a radio communication component configured to receive terminal location information and terminal position information, the terminal location information indicating information corresponding to a location where the wireless communication terminal is used, and the terminal position information indicating at least one of a tilt and a direction of the wireless communication terminal;
    a controller configured to acquire the terminal location information and the terminal position information and configured to generate communication situation information by measuring a communication situation between the wireless access device and the wireless communication terminal at a time of acquisition of the terminal position information; and a memory configured to hold the terminal location information, the terminal position information and the communication situation information so as to be associated with each other, wherein
the controller is configured to calculate recommended position information based on the terminal position information and the communication situation information, the recommended position information indicating at least one of a recommended tilt and a recommended direction for the wireless communication terminal, and
the radio communication component is configured to transmit the recommended position information to the wireless communication terminal corresponding to the terminal location information.

9. The wireless access device according to claim 8, wherein the controller is configured to calculate a relative direction of the wireless communication terminal with respect to a moving direction of the predetermined space and configured to acquire information indicating the direction of the wireless communication terminal based on the relative direction.

10. The wireless access device according to claim 8, wherein the controller is configured to calculate a direction and a tilt that correspond to a better communication situation from among the accumulated pieces of communication information when calculating recommended direction and tilt.

11. A wireless communication system comprising:
a wireless communication terminal configured to be connected to a wireless access device:
the wireless communication terminal having:
a memory for holding information processed by a controller,
a the controller configured to acquire terminal location information and terminal position information, the terminal location information indicating information corresponding to a location where the wireless communication terminal is used, and the terminal position information indicating at least one of a tilt and a direction of the wireless communication terminal;
a radio communication component configured to transmit the terminal location information and the terminal position information to the wireless access device,
wherein the radio communication component is configured to receive recommended position information indicating at least one of a recommended tilt and a recommended direction for the wireless communication terminal corresponding to the terminal location information; and
a display component configured to display the recommended position information,
the wireless access device having:
a radio communication component configured to receive terminal location information, terminal position information and communication situation information from the wireless communication terminal, the terminal location information indicating information corresponding to a location where the wireless communication terminal is used, the terminal position information indicating at least one of a tilt and a direction of the wireless communication terminal, and the communication situation information indicating a communication situation between the wireless access device and the wireless communication terminal at a time of acquisition of the terminal position information;
a controller configured to acquire the terminal location information, the terminal position information, and the communication situation information received by the radio communication component; and
a memory configured to hold the terminal location information, the terminal position information and the communication situation information so as to be associated with each other, wherein
the controller is configured to calculate recommended position information based on the terminal position information and the communication situation information, the recommended position information indicating at least one of a recommended tilt and a recommended direction for the wireless communication terminal, and
the radio communication component is configured to transmit the recommended position information to the wireless communication terminal corresponding to the terminal location information.

12. A method for wireless communication using a wireless communication terminal that connects to a wireless access device installed in a predetermined space, the method comprising:
transmitting terminal location information and terminal position information to the wireless access device, the terminal location information indicating information corresponding to a location where the wireless communication terminal is used, and the terminal position information indicating at least one of a tilt and a direction of the wireless communication terminal;
calculating a direction and a tilt that correspond to a better communication situation from among accumulated pieces of communication information when calculating recommended direction and tilt;
receiving recommended position information from the wireless access device, the recommended position information indicating at least one of a recommended tilt and a recommended direction for the wireless communication terminal corresponding to the terminal location information; and
displaying the received recommended position information on a display component.

13. A wireless communication system comprising:
a wireless communication terminal configured to be connected to a wireless access device:
the wireless communication terminal having:
a memory for holding information processed by a controller,
a the controller configured to acquire terminal location information and terminal position information, the terminal location information indicating information corresponding to a location where the wireless communication terminal is used, and the terminal position information indicating at least one of a tilt and a direction of the wireless communication terminal;
a radio communication component configured to transmit the terminal location information and the terminal position information to the wireless access device,
wherein the radio communication component is configured to receive recommended position information indicating at least one of a recommended tilt and a recommended direction for the wireless communication terminal corresponding to the terminal location information; and
a display component configured to display the recommended position information,
the wireless access device having:
a radio communication component configured to receive terminal location information and terminal position information, the terminal location information indicating information corresponding to a location where the wireless communication terminal is used, and the terminal position information indicating at least one of a tilt and a direction of the wireless communication terminal;

a controller configured to acquire the terminal location information and the terminal position information and configured to generate communication situation information by measuring a communication situation between the wireless access device and the wireless communication terminal at a time of acquisition of the terminal position information; and a memory configured to hold the terminal location information, the terminal position information and the communication situation information so as to be associated with each other, wherein the controller is configured to calculate recommended position information based on the terminal position information and the communication situation information, the recommended position information indicating at least one of a recommended tilt and a recommended direction for the wireless communication terminal, and the radio communication component is configured to transmit the recommended position information to the wireless communication terminal corresponding to the terminal location information.

* * * * *